J. Fleming.
Pile Driver.
N° 12,789.  Patented May 1, 1855.

UNITED STATES PATENT OFFICE.

JAMES FLEMING, OF PORTSMOUTH, VIRGINIA.

MACHINE FOR SAWING OFF PILES UNDER WATER.

Specification of Letters Patent No. 12,789, dated May 1, 1855.

*To all whom it may concern:*

Be it known that I, JAMES FLEMING, of Portsmouth, in the county of Norfolk and State of Virginia, have invented a new and useful Machine for Sawing Off Piles Under Water; and I do hereby declare that the following is a full, clear, and exact description of the construction and operation of the same; reference being had to the annexed drawings, making a part of this specification, in which—

Figure 1:
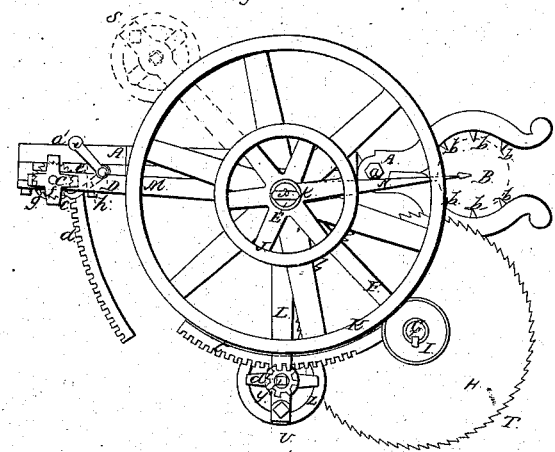
Figure 2:
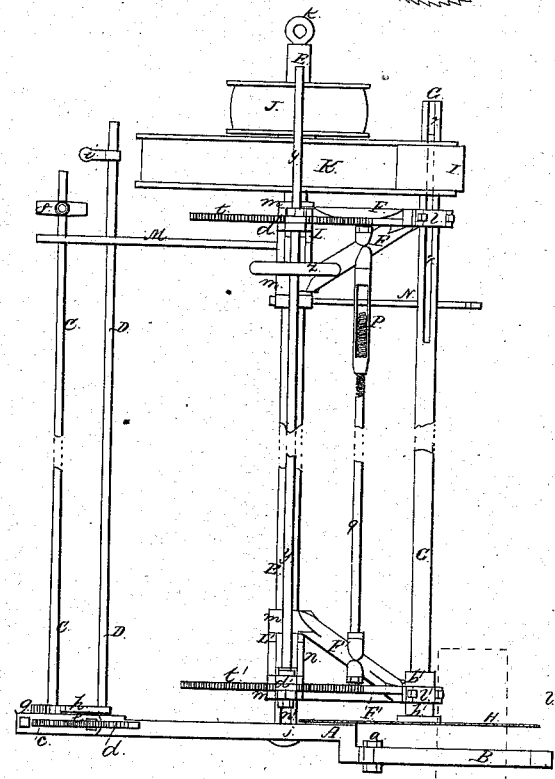
Figure 3:
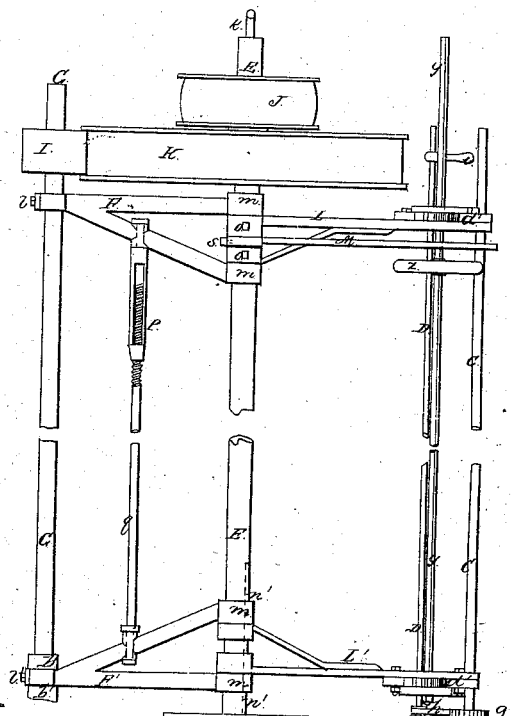

Figure 1 is a plan; Fig. 2, an elevation; Fig. 3, another elevation showing more clearly some of the details, and Fig. 4 other details.

The nature of my invention consists in the adaptation of a circular saw with its necessary gear to a clamp or tongs, in such a manner that the latter may be secured to or upon the pile to be sawed off while the former may be adjusted and acted upon so as to cut off the pile at any desired depth under water.

To enable others skilled in the art to make and use my invention, I will proceed to describe its construction and operation.

The lower portion of the machine A is a clamp or tongs the two parts thereof moving upon a pivot $a$; the ends of the tongs forming the jaws B, for fastening to the pile to be sawed are armed with teeth $b\ b\ b\ b$; for the purpose of fastening more securely. These tongs are usually made with the ends B somewhat lower than the other, as represented in the drawing, the object of which arrangement is to keep the longer portion of the tongs clear of such piles as have been sawed off while the clamp or jaws are being adjusted to the others to be sawed. The jaws are made to open to receive the piles and to shut by means of a small pinion $c$ which engages the teeth of a curved rack $d$, the center from which it is formed being at $a$. The rack $d$ is fixed to one end of the tongs at $a'$ and passes through a slot $e$ in the other end in which turns the pinion $c$. This pinion is moved by the vertical rod C, the lower end of which forms the axis upon which it turns. $f$ is a capstan wheel for turning this vertical rod. Above the pinion $c$ and fixed to the vertical rod C which passes through its center is a ratchet wheel $g$ which turns with the rod and receives a pawl $h$ connected to the end of a vertical rod D; the rod D is borne in one part or arm of the tongs and is moved by the handle $i$.

E is an upright stationary shaft fixed at $j$ into one of the parts of the tongs and at right angles with them; at the top of this shaft is a ring $k$ by which the machine is raised or lowered in the water. Upon the shaft E are borne the two arms F F' which swing freely at right angles with it, and carry in the boxes at their ends $l\ l'$ the vertical shaft G to which the saw H and the pulley I are fixed. The saw shaft has a fixed bearing in the lower box $l'$ by means of the projections $b'\ b'$ while it slides freely through the upper box $l$. The saw H is secured to the end of the shaft G by a square projection on the latter passing through a corresponding hole in the saw and being screwed on to the end of the shaft with countersunk head screws so that the underside of the saw may be left perfectly plane.

The driving pulley J which communicates action to the machine, and the friction wheel K are connected so as to revolve together and run loose upon the shaft E, the wheel K giving motion to the saw by acting upon the pulley I. The pulley I by means of a feather running in a spline $r$ cut in the shaft G can be moved up or down so as always to run in connection with the wheel K. The wheel K and pulley I although here represented to act by the adhesion or friction of their surfaces may be made to act either by a belt or gear.

The arms F F' have each two branches terminating in the bosses $m\ m\ m\ m$, through which the shaft E passes, and between these bosses another and similar set of arms L L' are borne on the shaft. The lower arm L' is fixed in a vertical position upon the shaft and is made, by means of a feather $n$ acting in a spline $n'$ cut in the shaft, to move up and down.

The upper arm L is placed exactly over the lower one L' and secured in the same vertical plane with it by means of set screws $o\ o$, this arm L being hung and secured on the shaft E between the bosses of the arm F, as seen more clearly in Fig. 3, supports this latter arm and confines it in its horizontal position; the upper arm F being thus supported and secured, admits of the lower arm F' being adjusted at any distance from it by means of the turnbuckle $p$ operating upon the screw at the end of the rod $q$ attached to and turning in this lower arm and thus raises or lowers the saw to the exact degree required in the operation of cutting off the pile.

A small pinion $d'$ is placed in a slot in each of the outer ends of the arms L L' which engage into the teeth of the curved racks $t$ $t'$ having their center at $x$ and passing through the slot and fixed to the arms F F' respectively near their outer ends. These pinions are turned by the vertical rod $y$ to which is fixed the hand feed wheel $z$. This arrangement is for feeding up the saw as it is required when cutting off piles and will be more particularly described hereafter.

The arm M is borne on the vertical shaft E between the bosses of the arm L and secured directly over one of the arms of the tongs in the same direction with it, by means of a set screw $s$, and is for the purpose of holding up the rods C and D.

Another arm N called the indicator is attached to the shaft E and points in the direction of the center of the jaws B, its end being very nearly over this point. The purpose of the indicator is to show the position of the jaws when the lower part of the machine is submerged.

Figure 4:
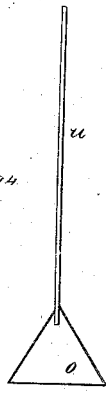

The pile finder O, Fig. 4 is a simple conical hood of sheet iron or other thin metal fixed to the end of a pole or handle $u$, and is used for searching and showing the position of the pile to be sawed off.

Having thus described the machine, I will proceed to show its operation. It can be used either from a floating vessel, or from a fixed scaffold; but as I have only had it in operation from the latter, I will explain the method of its use and adjustment with this arrangement.

A simple frame of wood supported upon the scaffold placed over the piles to be sawed, with any arrangement for hoisting and lowering, or a crane, may be used for suspending the machine by the ring $k$. The pile to be sawed being found by the finder O, whose handle, being held vertically, indicates the position of the pile under its hood, the machine, with the jaws B opened, is brought toward it in the direction shown by the indicator N, and when the pile has entered the jaws, the whole machine is lowered approximately to the depth required by the sawing. The jaws B are then closed around the pile by turning the capstan wheel $f$ which moves the pinion $c$ and brings together the opposite extremities of the tongs by means of the curved rack $d$. The pawl $h$ is then thrown into the ratchet $g$ and effectually secures the hold of the jaws upon the pile.

The head of the shaft E is next braced or secured in its proper position, and an exact adjustment of the saw to the depth of cutting off the pile, made by means of the turnbuckle $p$ operating upon the screw at the end of the rod $q$ which raises or lowers the arm F' carrying the lower end of the shaft G to which the saw is fixed. In this adjustment of the saw it will be observed that the horizontal position of the upper arm F is fixed, as before described, and the saw shaft slides freely through the box $l$ at its extremity. Motion is then given to the pulley J, by means of a belt proceeding from the driving power, and communicated to the pulley I through the wheel K, and the saw set in action. The operation of feeding up the saw to the pile is then effected by means of the small pinions $d'$ $d'$ in the ends of the arms L L' and the curved racks $t$ $t'$. The arms L L' being fixed in their vertical position upon the shaft E, the lower one L', by means of the feather $n$ acting in the spline $n'$, and the upper one L by the set screws $o$ $o$, as before described, cannot swing upon the shaft E but form the fixed points of resistance from which the arms F F' carrying the saw shaft and saw, are moved; the small pinions $d'$ $d'$ consequently, acting upon the curved racks $t$ $t'$ fixed to the ends of the arms F F', communicate a horizontal motion to these latter arms which carry the saw toward the pile, the feed being regulated at pleasure and while the sawing is going on, by means of the hand feed wheel, $z$.

When the pile is cut off, the saw is drawn back by reversing the motion of the feed wheel, the pawl $h$ thrown out of the ratchet $g$, and the jaws B loosened from the pile by the reverse motion of the pinion $c$, and the machine moved to other piles requiring its action.

What I claim as my invention and desire to secure by Letters Patent, is—

1. The combination of a circular saw and its shaft carried in movable arms upon and around a stationary shaft which sustains the driving pulleys, and which is fixed to an adjustable tongs or clamp, substantially as above described, for the purpose of cutting or sawing off piles under water.

2. I also claim the method of fastening to the pile to be sawed by means of a clamp or adjustable tongs with suitable jaws and teeth as above described.

3. I further claim the method of feeding a circular saw from points of resistance fixed upon a stationary shaft, by means of arms, curved racks and pinions, as above set forth.

JAMES FLEMING.

Witnesses:
 CALVIN BROWN,
 LEMUEL T. CLEAVES.